United States Patent [19]
Oyama et al.

[11] Patent Number: 5,337,507
[45] Date of Patent: Aug. 16, 1994

[54] HANDLE FOR FISHING ROD

[75] Inventors: Mitsuyoshi Oyama; Tomoyoshi Tsurufuji, both of Tokyo, Japan

[73] Assignee: Daiwa Seiko, Inc., Tokyo, Japan

[21] Appl. No.: 74,620

[22] Filed: Jun. 11, 1993

[30] Foreign Application Priority Data

Jun. 20, 1992 [JP] Japan ................ 4-049097[U]

[51] Int. Cl.⁵ .................................. A01K 87/00
[52] U.S. Cl. ............................... 43/23; 43/22
[58] Field of Search ........................ 43/22, 23

[56] References Cited

U.S. PATENT DOCUMENTS

| | | | |
|---|---|---|---|
| 2,085,654 | 6/1937 | Harris . | |
| 4,516,351 | 5/1985 | Highby | 43/23 |
| 4,644,680 | 2/1987 | Dawson | 43/23 |
| 4,848,022 | 7/1989 | Ozeki et al. | 43/22 |
| 4,870,774 | 10/1989 | Yamato . | |
| 5,048,223 | 9/1991 | Yamamoto | 43/22 |
| 5,115,591 | 5/1992 | Oyama | 43/22 |
| 5,222,319 | 6/1993 | Yamato | 43/22 |

FOREIGN PATENT DOCUMENTS

| | | |
|---|---|---|
| 57-62567 | 4/1982 | Japan . |
| 60-241834 | 11/1985 | Japan . |
| 62-24668 | 2/1987 | Japan . |
| 2-174624 | 7/1990 | Japan . |

*Primary Examiner*—Kurt C. Rowan
*Attorney, Agent, or Firm*—Longacre & White

[57] ABSTRACT

A handle for fishing rod extends on the tubular body 10 of the fishing rod, and includes a hand-held portion 16 corresponding to the exposed part 10P of the tubular body and having bridges extending off the exposed part along the side surfaces thereof. The handle is reduced in weight, it is easy for a fishing person to hold the handle by his hand, the hand holding the handle is less likely to slip thereon, and the person can feel the bite of a fish well.

10 Claims, 8 Drawing Sheets

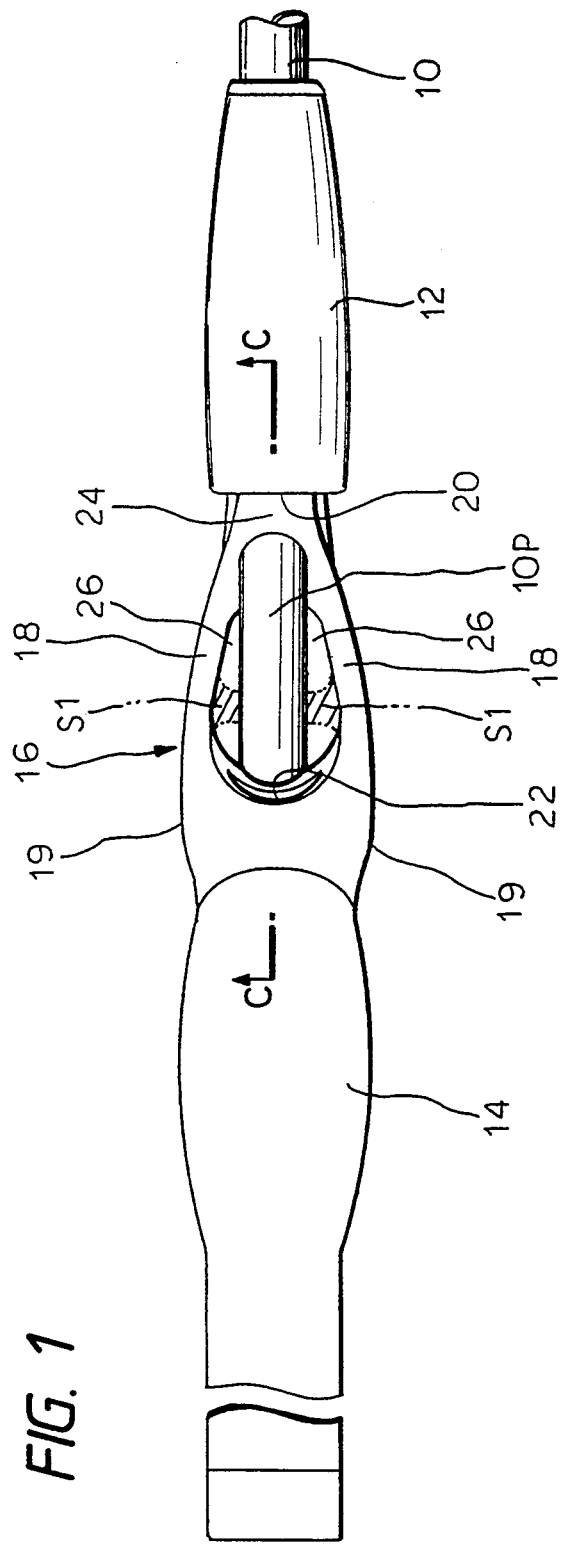
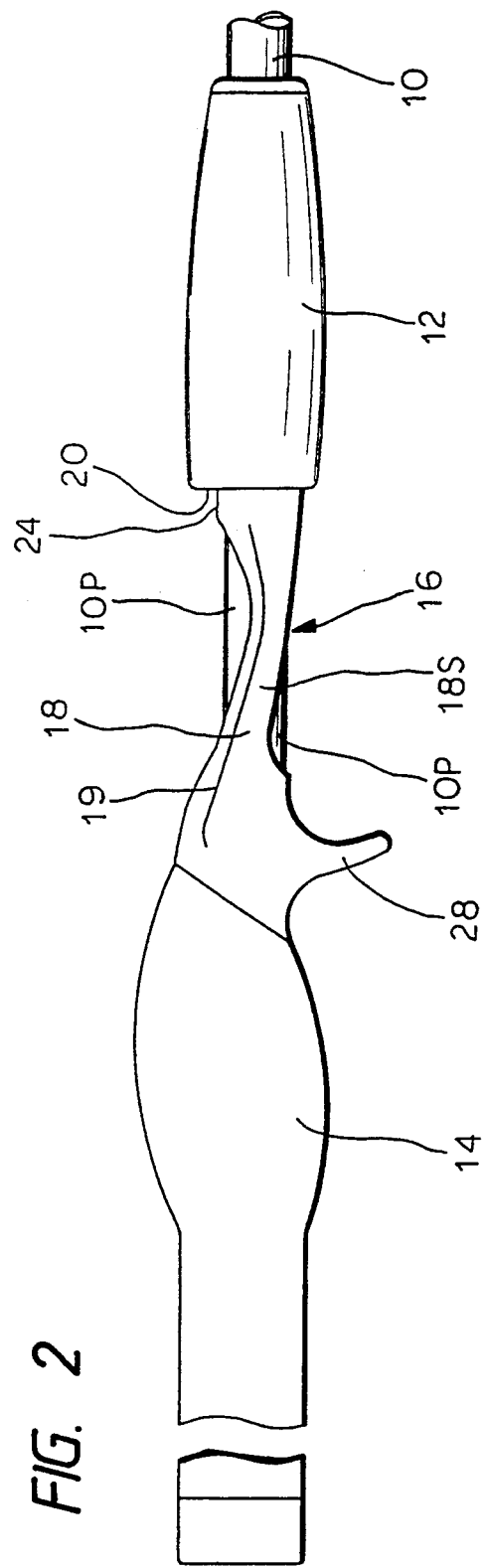
FIG. 1
FIG. 2

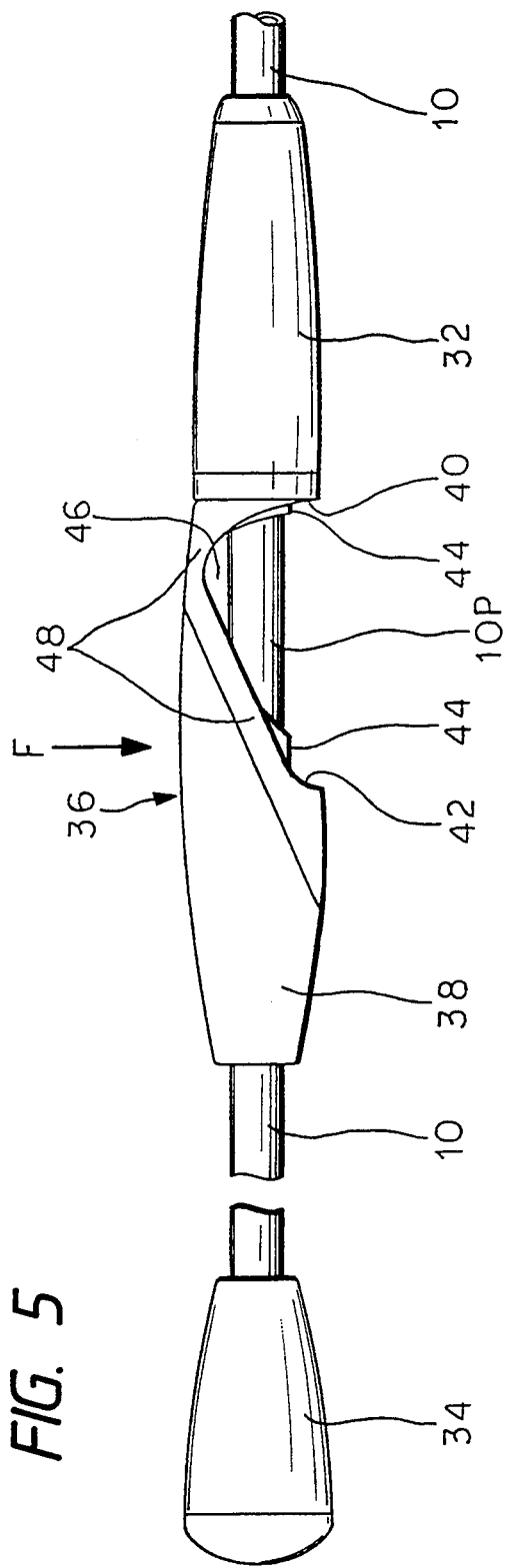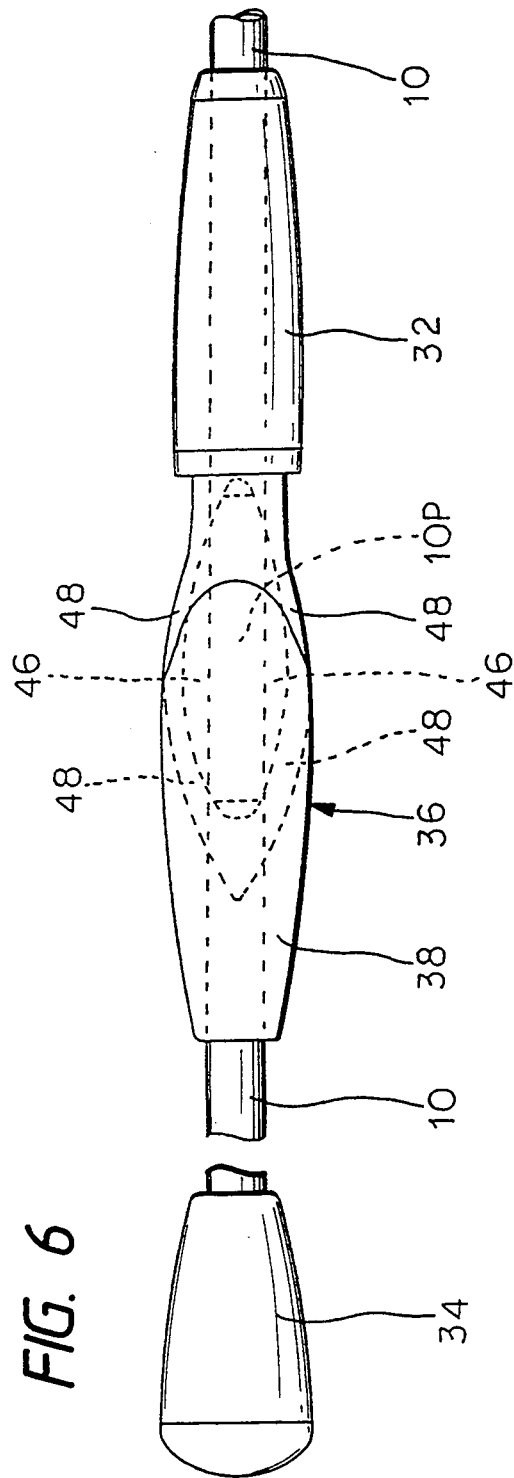

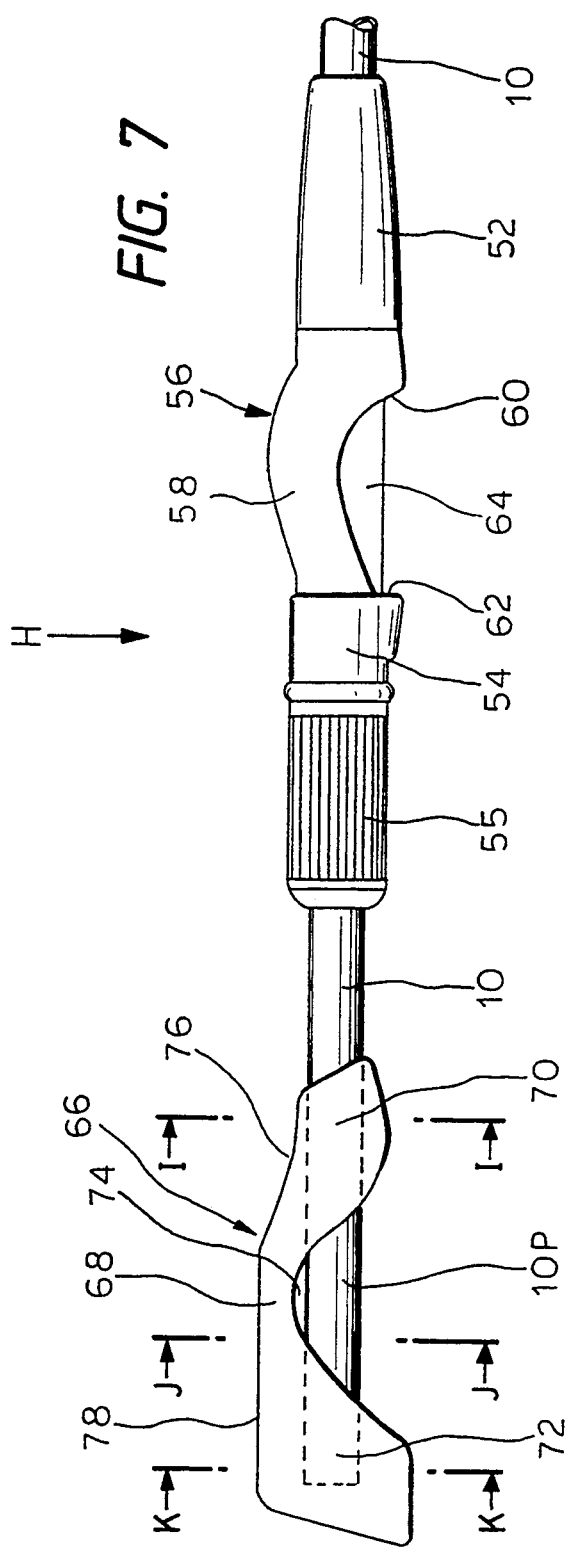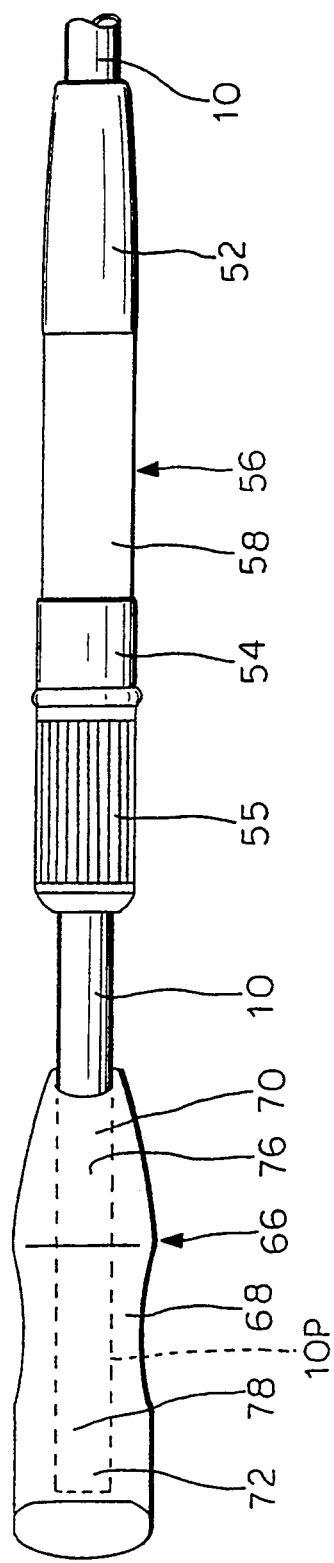
FIG. 7
FIG. 8

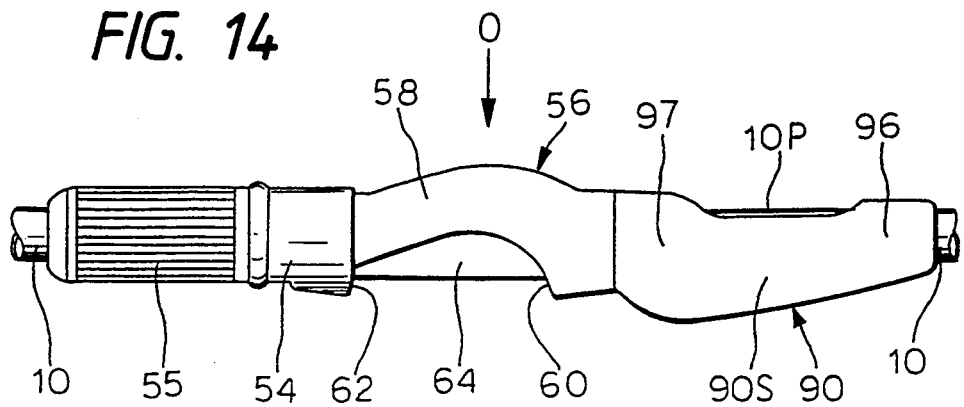
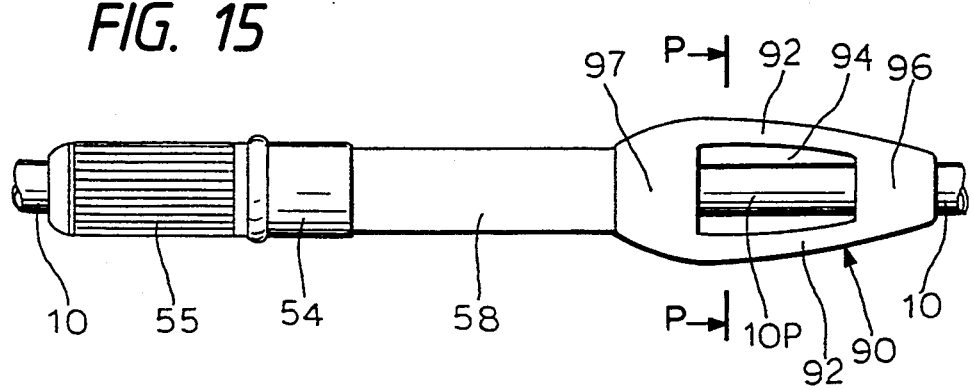
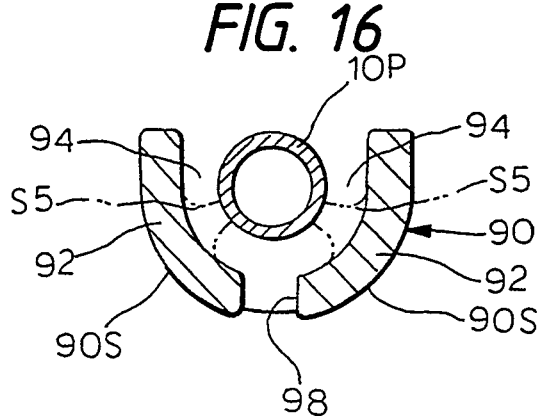
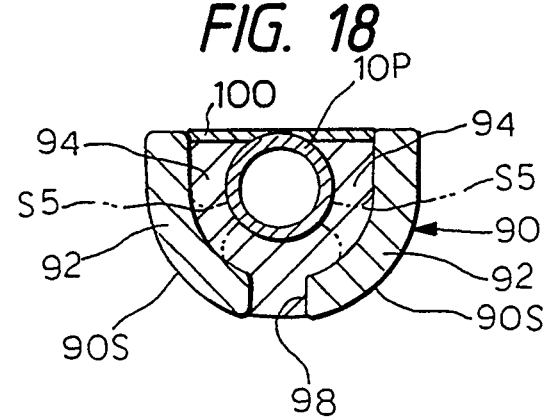

HANDLE FOR FISHING ROD

BACKGROUND OF THE INVENTION

The present invention relates to a handle which is for a fishing rod and which has a particular hand-held portion which includes a merely grasped portion and a reel mounting portion which is held by the hand of a fishing person when he performs a palming action.

A conventional handle for a fishing rod such as a fly casting rod includes a reel mounting portion as disclosed in the Japanese Patent Application (OPI) No. 241834/85 (the term "OPI" as used herein means an "unexamined published application"). The constitution of the reel mounting portion is contrived to facilitate the manufacturing thereof, reduce the weight thereof and improve the fish bite transmitting property thereof.

Another conventional handle for a fishing rod includes a reel mounting portion, the width of the lower part of which is increased to improve the fitness feeling of a fishing person in his palming action, as disclosed in the Japanese Patent Application (OPI) No. 174624/90.

Yet another conventional handle for a fishing rod includes a reel mounting portion, which is a hand-held portion, and a member having an uncircular cross section, secured to the reel mounting portion and covering the rear part thereof, to make it easy to hold the handle by the hand of a fishing person to manipulate the rod, as disclosed in the Japanese Utility Model Application (OPI) No. 62567/82.

Yet another conventional handle for a fly casting rod includes a rear hand-held portion formed with a sloping hand-held part bulgingly on the body of the portion to make it easy to hold the handle by the hand of a fishing person to manipulate the rod, as disclosed in the Japanese Utility Model Application (OPI) No. 24668/87.

Although the conventional handle disclosed in the Japan Patent Application (OPI) No. 241834/85 is easier of manufacturing, smaller in weight and better in fish bite transmitting property than prior handles, the reel mounting portion is so large in size that a hand holding the portion is more likely to slip thereon in the circumferential direction thereof. The handle is not best in fish bite transmitting property.

Although the conventional handle disclosed in the Japanese Patent Application (OPI) No. 174624/90 is easy of the palming action, the width of the reel mounting portion is increased so that the handle is heavier. Since the bottom of the reel mounting portion is a smoothly curved surface, a hand holding the portion is more likely to slip thereon in the circumferential direction thereof. Since the reel mounting portion covers the tubular body of the fishing rod, it is difficult to feel the bite of a fish at the portion.

Although it is easy for the hand of the fishing person to hold the hand-held portion of each of the conventional handles disclosed in the Japanese Utility Model Applications Nos. 62567/82 and 24668/87, the handles are heavy because the portion is large in length and diameter. Since the hand-held portion covers the tubular body of the fishing rod, it is difficult to feel the bite of a fish at the portion. The peripheral form of the portion is so simple and smooth that the hand holding the portion cannot be engaged thereon well enough not to slip thereon.

SUMMARY OF THE INVENTION

The present invention was made in order to solve the problems described above. Accordingly, it is an object of the invention to provide a handle which is for a fishing rod and is such that the handle is reduced in weight and good in fish bite transmitting property, it is easy to hold the handle by a hand, and the hand holding the handle is less likely to slip thereon.

The handle extends on the tubular body of the fishing rod, and is characterized by including a hand-held portion corresponding to the exposed part of the tubular body and having bridges extending off the exposed part along the side surfaces thereof.

Since the hand-held portion of the handle provided in accordance with the present invention has the bridges extending off the exposed part of the tubular body of the fishing rod along the side surfaces of the part, it is easy to hold the portion by the hand. Since the flesh of the hand holding the portion enters partially into openings between the exposed part and the bridges depending on the force of the holding, the hand is less likely to slip on the portion. Since the hand holding the portion comes into contact with the exposed part, it is easy to feel the bite of a fish.

BRIEF DESCRIPTION OF THE DRAWINGS

In the accompanying drawings:

FIG. 1 is a plan view of a handle which is an embodiment of the present invention and is for a fishing rod on which a fly casting reel is mounted;

FIG. 2 is a side view of the handle;

FIG. 5 is a side view of a handle which is another embodiment of the invention and is for a fishing rod on which a spinning reel is mounted;

FIG. 6 is a plan view of the handle, seen along an arrow F shown in FIG. 5;

FIG. 7 is a side view of a handle which is yet another embodiment of the invention and is for a fishing rod on which a spinning reel is mounted;

FIG. 8 is a plan view of the handle, seen along an arrow H shown in FIG. 7;

FIG. 14 is a partial side view of a handle which is yet another embodiment of the invention and is for a fishing rod on which a spinning reel is mounted;

FIG. 15 is a plan view of the handle, seen a long an arrow O shown in FIG. 14;

FIG. 16 is a cross-sectional view of the handle along lines P shown in FIG. 15;

FIG. 18 is a cross-sectional view showing another modification of the invention.

DETAILED DESCRIPTION OF THE PREFERRED EMBODIMENTS

Embodiments of the present invention are hereafter described with reference to the drawings attached hereto.

Figure 3:
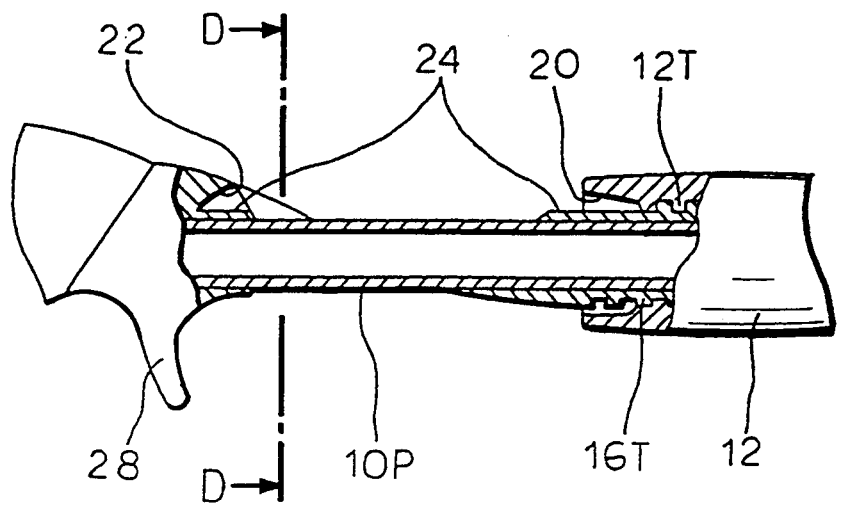
FIG. 3 is a partially and longitudinally sectional view of the handle along lines C shown in FIG. 1.
Figure 4:
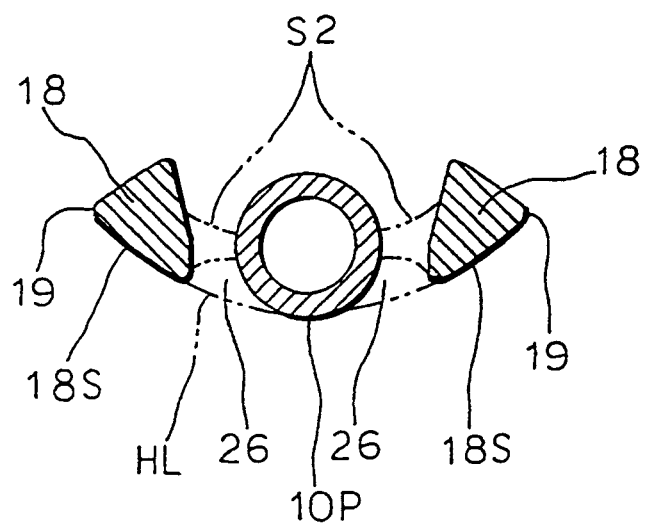
FIG. 4 is a cross-sectional view of the handle along lines D shown in FIG. 3.

FIG. 1 is a plan view of a handle which is one of the embodiments and is for a fishing rod on which a fly casting reel is to be mounted. FIG. 2 is a side view of the handle. FIG. 3 is a partially and longitudinally sectional view of the handle. FIG. 4 is a cross-sectional view of the handle along lines D shown in FIG. 3. The fishing rod includes a tubular body 10, and the handle. The handle includes a front hand-held portion 12, a rear hand-held portion 14, and a reel mounting portion 16 which is held by the hand of a fishing person when he performs a palming action.

The tubular body 10 of the fishing rod is formed by winding a prepreg made of high-strength fibers and a synthetic resin impregnated therein, and is inserted into the handle so that the rear portion of the tubular body extends through the front hand-held portion 12 and reel mounting portion 16 of the handle, and the rear end of the tubular body is located in the rear hand-held portion 14 of the handle. The rear portion of the tubular body 10 is stuck to the rear hand-held portion 14 by an adhesive. Also, the reel mounting portion 16 of the handle is stuck by an adhesive to the tubular body 10 except the exposed part 10P of the rear portion of the tubular body, and also to the rear hand-held portion 14.

The female-threaded part 12T of the front hand-held portion 12 of the handle is engaged with the male-threaded front part 16T of the reel mounting portion 16 thereof so that the front hand-held portion can be moved back and forth on the reel mounting portion while being turned, and is secured thereto after the foot of the reel is inserted into the reel foot receiving front and rear parts 20 and 22 of the handle.

The reel mounting portion 16 has an upper surface 24 which serves as a reel foot rest on which the foot of the reel is placed. The reel mounting portion 16 has the reel foot receiving rear part 22 behind the reel foot rest 24. The opening between the rest 24 and the front hand-held portion 12 serves as the reel foot receiving front part 20.

Both the bridges 18 of the reel mounting portion 16 extend off the exposed part 10P of the rear portion of the tubular body 10 along the side surfaces of the exposed part, and have side edges 19 curved as a part of an ellipse so as to taper toward the front end of the reel mounting portion, as shown in FIG. 1. Openings 26 are defined between the exposed part 10P and the bridges 18. Since most of the strength of the fishing rod is ensured by that of the tubular body 10, the openings 26 do not make the strength of the insufficient.

The lower surfaces of the bridges 18 are located slightly higher than the lower surface of the exposed part 10P on the whole, as shown in FIG. 4. For that reason, when the reel mounting portion 16 is held by the hand of the fishing person, the fingers of the hand are put in contact with the bottoms 18S of the bridges 18 and that of the exposed part 10P so that the fingers are smoothly curved, as shown by a dotted line HL in FIG. 4. This makes the holding easy. Although the reel mounting portion 16 is increased in width at the bridges 18 to place them outside the side surfaces of the exposed part 10P to make the holding easy, the weight of the reel mounting portion is reduced because of the provision of the openings 26. Since the flesh of the hand holding the reel mounting portion 16 around the exposed part 10P enters partially into the openings 26, the hand is less likely to slip on the bottom of the portion in the circumferential direction thereof. The partial entry of the flesh into the openings 26 is automatically controlled depending on the magnitude of the force of the holding, to prevent the slippage. Since the fingers of the hand holding the portion 16 are in direct and wide contact with the exposed part 10P, the person can feel the bite of a fish well.

The handle also includes a jut 28 on which the finger of the hand holding the handle is engaged.

Although the strength of the fishing rod is mostly and sufficiently shared by the tubular body 10, reinforcing ribs S1 shown by dotted lines in FIG. 1 or reinforcing ribs S2 shown by dotted lines in FIG. 4 may be provided between the exposed part 10P of the tubular body and the bridges 18 of the reel mounting portion 16 to increase the strength of the rod.

FIG. 5 and 6 show a handle which is another of the embodiments and is for a fishing rod on which a spinning reel is mounted. The fishing rod includes a tubular body 10, and the handle. The handle includes a front hand-held portion 32, a rear hand-held portion 34, and a reel mounting portion 36.

The rear portion of the tubular body 10 is inserted into the handle so that the rear end of the body is located in the rear hand-held portion 34 of the handle. The rear portion of the body 10 is stuck to the rear hand-held portion 34 and the reel mounting portion 36 by an adhesive except the exposed part 10P of the rear portion of the body. The female-threaded part of the front hand-held portion 32 is engaged with the male-threaded front part of the reel mounting portion 36 so that the front hand-held portion can be moved back and forth thereon while being turned, and is secured to the reel mounting portion after the foot of the reel is inserted into the reel foot receiving front and rear parts 40 and 42 of the handle.

The reel mounting portion 36 includes a hand-held part 38, a reel foot mounting front part 44, a reel foot mounting rear part 42, an opening which serve as the reel rest receiving front part 40 between the reel foot mounting front part and the front hand-held portion 32, another opening which serves as the reel foot receiving rear part 42, and bridges 48 extending forward from the hand-held part 38 and integrated therewith so that openings 46 are defined between the exposed part 10P of the tubular body 10 and the bridges 48, as shown in FIGS. 5 and 6. Since the bridges 48 extend off the exposed part 10P along the side surfaces thereof so that the reel mounting portion 36 is increased in width at the bridges, it is easy for a fishing person to hold the bridges and the foot of the reel together by his hand so that the fingers of the hand are located under the wrist. The weight of the handle is reduced because of the provision of the openings 46. Since the flesh of the palm and fingers of the hand holding the reel mounting portion 36 enters partially into the openings 46, the hand is less likely to slip on the portion. Since the hand holding the portion 36 is in direct and wide contact with the side surfaces of the exposed part 10P of the tubular body 10, the fishing person can feel the bite of a fish well.

Reinforcing ribs may be provided between the exposed part 10P and the bridges 48 as well as the preceding embodiment.

Figure 9:
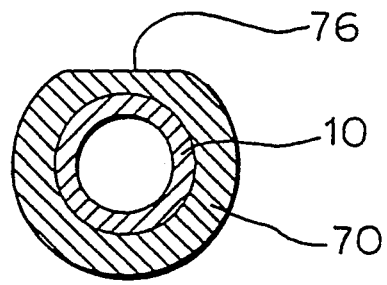
FIG. 9 is a cross-sectional view of the handle along lines I shown in FIG. 7.
Figure 10:
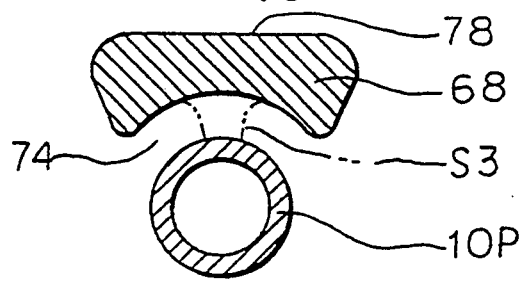
FIG. 10 is a cross-sectional view of the handle along lines J shown in FIG. 7.
Figure 11:
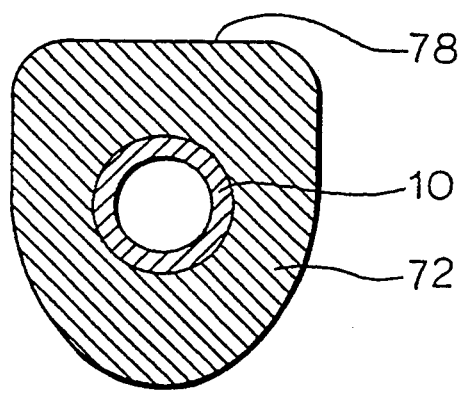
FIG. 11 is a cross-sectional view of the handle along lines K shown in FIG. 7.

FIGS. 7, 8, 9, 10 and 11 show a handle which is yet another of the embodiments and is for a fishing rod on which a spinning reel is mounted. FIG. 7 is a side view of the handle. FIG. 8 is a plan view of the handle. FIGS. 9, 10 and 11 are cross-sectional views of the handle. The fishing rod includes a tubular body 10, and the handle. The handle includes a front hand-held portion 52, a reel mounting portion 56, and a rear hand-held portion 66.

The front hand-held portion 52 extends on the tubular body 10, and is stuck thereto by an adhesive.

The reel mounting portion 56 includes a movable cover 54, a clamping nut 55, and a reel support member 58. The movable cover 54 surrounds the rear end of the reel support member 58, and can be moved back and forth. When the clamping nut 55 is tightened to mount the reel on the reel mounting portion 56, the cover 54 is moved forth so that it is kept in pressure contact with the rear end of the reel support member 58 at the rear end thereof. The reel support member 58 has a lower front portion which serves as the reel foot receiving front part 60 of the reel mounting portion 56 to receive the front end portion of the foot of the reel. The movable cover 54 has a lower portion which serves as the reel foot receiving rear part 62 of the reel mounting portion 56 to receive the rear end portion of the foot of the reel. At the time of the mounting of the reel on the portion 56, the foot of the reel is put in the reel foot receiving parts 60 and 62, and the nut 55 is then tightened to secure the foot with the cover 54.

The front and rear parts 70 and 72 of the rear hand-held portion 66 are stuck to the tubular body 10 by an adhesive, and coupled to each other by the bridge 68 of the portion. The bridge 68 is located off the exposed part 10P of the tubular body 10, and extends not only the part but also sideward across it, so that an opening 74 is defined between the bridge and the exposed part. The top of the rear hand-held portion 66 has a finger contact surface 76, and a flat surface 78. When the portion 66 is held by the hand of a fishing person, the thumb and fingers of the hand are put on the finger contact surface 76.

A reinforcing rib S3 may be provided between the bridge 68 and the exposed part 10P as well as the preceding embodiments.

Since the bridge 68 extends sideward across the exposed part 10P, it is easy for the fishing person to hold the rear hand-held portion 66. The weight of the handle is reduced because of the provision of the opening 74. Since the flesh of the palm and fingers of the hand holding the portion 66 enters partially into the opening 74, the hand is less likely to slip on the portion. Since the hand holding the portion 66 is in direct and wide contact with the bottom and side surfaces of the exposed part 10P, the fishing person can feel the bite of a fish well.

Figure 12:
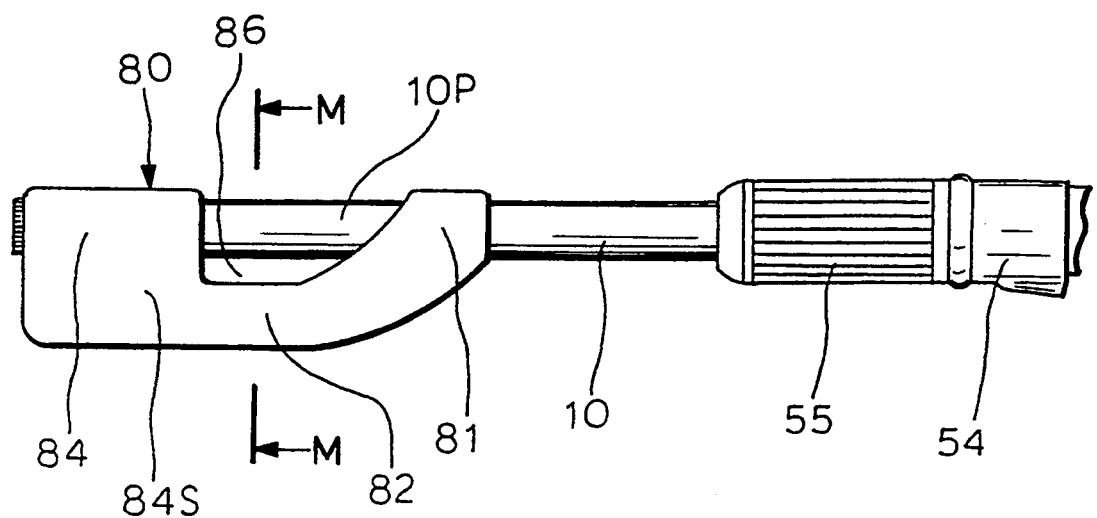
FIG. 12 is a partial side view of a handle which is yet another embodiment of the invention and is for a fishing rod on which a spinning reel is mounted.
Figure 13:
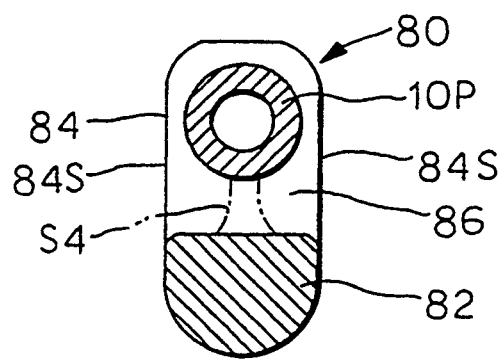
FIG. 13 is a cross-sectional view of the handle along lines M shown in FIG. 12.
Figure 17A:
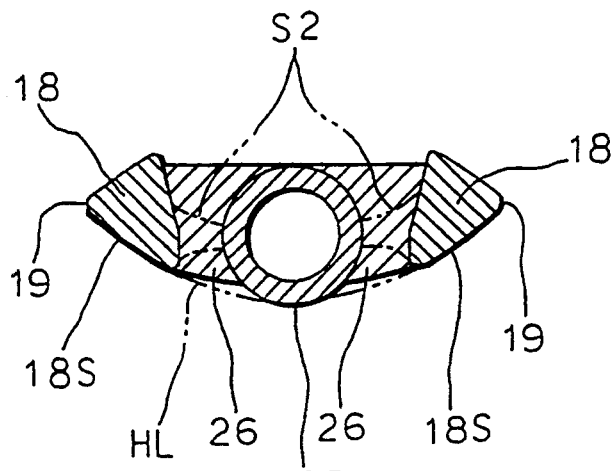
FIGS. 17A to 17D are cross-sectional views showing modifications of the embodiments of the present invention.
Figure 17B:
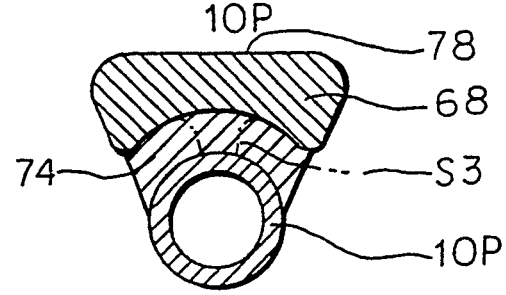
Figure 17C:
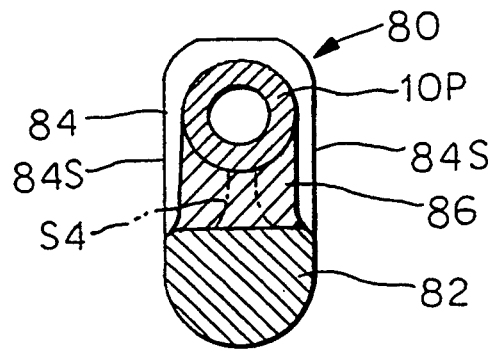
Figure 17D:
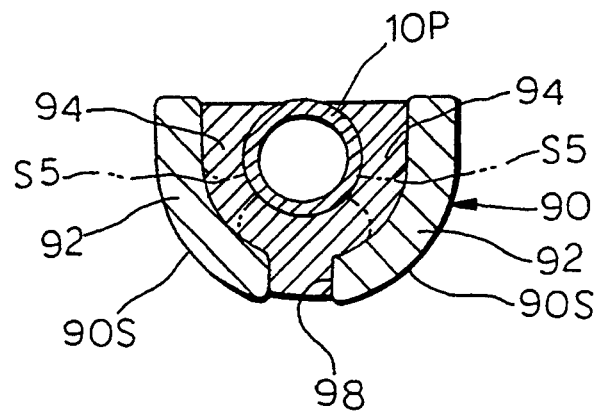

FIGS. 12 and 13 show a handle which is yet another of the embodiments and is for a fishing rod on which a spinning reel is mounted. The fishing rod includes a tubular body 10, and the handle. The difference of the handle from that shown in FIGS. 7 and 8 is that the handle shown in FIGS. 12 and 13 includes a rear held portion 80 to be held in between the arm and breast side of a fishing person. The front and rear parts 81 and 84 of the rear held portion 80 are stuck to the tubular body 10 by an adhesive, and coupled to each other by the bridge 82 of the portion. The bridge 82 is located under the exposed part 10P of the tubular body 10, and extends not only along the part but also sideward across it, so that an opening 86 is defined between the bridge and the part. The rear held portion 80 has flat and wide side surfaces 84S appropriate to be held in between the arm and breast side of the fishing person, and is reduced in weight because of the provision of the opening 86. Since the exposed part 10P is directly held in between the arm and breast side of the person, he can feel the bite of a fish well.

A reinforcing rib S4 may be provided between the bridge 82 and the exposed part 10P as well as the preceding embodiments.

Shown at 54 and 55 in FIG. 12 are a movable cover and a clamping nut, respectively.

FIGS. 14, 15 and 16 show a handle which is yet another of the embodiments and is for a fishing rod on which a spinning reel is mounted. The fishing rod includes a tubular body 10, and the handle. The handle includes a reel mounting portion 56, and a front hand-held portion 90.

The reel mounting portion 56 includes a movable cover 54, a clamping nut 55, and a reel support member 58. The cover 54 has a lower front portion which serves as the reel foot receiving rear part 62 of the reel mounting portion 56 to receive the rear end portion of the foot of the reel. The reel support member 58 has a lower front portion which serves as the reel foot receiving front part 60 of the portion 56 to receive the front end portion of the foot of the reel.

The front hand-held portion 90 extends not only on the tubular body 10, but also sideward therefrom. The front and rear parts 96 and 97 of the front hand-held portion 90 are stuck to the tubular body 10 by an adhesive, and coupled to each other by the bridges 92 of the portion. The bridges 92 extend off the exposed part 10P of the tubular body 10 along the side surfaces of the part. Since the front hand-held portion 90 extends off the side surfaces of the exposed part 10 and the bottom 90S of the portion slopes down from the front part 96 thereof to the rear part 97 thereof, it is easy for a fishing person to hold the portion by his hand so that the fingers thereof are located under the portion. Since an opening 94 is defined between the exposed part 10P and the bridges 92, the handle is reduced in weight. Since the flesh of the hand holding the portion 90 enters partially into an opening 98 provided in the portion at the lowermost part of the bottom 90S thereof and communicating with the opening 94, the hand is less likely to slip on the portion. Since the thumb of the hand holding the portion 90 is in direct and sufficient contact with the top of the exposed part 10P, the fishing can feel the bite of a fish well.

Reinforcing ribs S5 may be provided between the exposed part 10P and the bridges 92 as well as the preceding embodiments.

In each of the embodiments shown in FIGS. 1, 7, 12 and 16, the opening or space formed by the bridge and the exposed part may by filled with a natural cork or a foam material which has a small specific gravity, as shown in FIGS. 17A–17D. It is preferable to use the material softer than that of the bridge. In this case, in addition to the above-noted advantages, the device provides an advantageous feature that it is easier to perform the maintenance to that portion, and possible to prevent the excessive entry of the flesh into the space.

Additionally, as shown in FIG. 18, a finger rest 100 may be provided in the handle so as to contact with the exposed part 10P of the tubular body 10. It is preferable that the finger rest 100 is made of material having excellent vibration transmissible property and/or the outer surface of the finger rest 100 is designed to prevent slippage of the finger.

Although the present invention is applied to one of the held portions of each of the handles, the invention may be applied to a plurality of the held portions. Besides, the invention may be applied to the held portion of a fishing rod having no reel mounting portion.

According to the present invention, such a handle that it is reduced in weight and has a form which makes it easy for a fishing person to hold the handle by his hand, the hand holding the handle is less likely to slip thereon, and the person can feel the bite of a fish well can be provided for a fishing rod.

What is claimed is:

1. A handle for a fishing rod, which is mounted on a tubular body of said rod and extends in a longitudinal direction of said tubular body, said handle comprising:
   a hand-held portion including:
      first and second end portions spaced apart from each other in said longitudinal direction and both fixed to said tubular body; and
   at least one bridge connecting said first and second end portions and expanding radially outward relative to said first end portion with respect to said tubular body, wherein an entire circumference of said tubular body between said first and second portions is exposed.

2. The handle according to claim 1, wherein said hand-held portion further includes at least one reinforcing rib for transversely connecting said bridge to said tubular body.

3. The handle according to claim 1, wherein said hand-held portion further includes a front hand-held portion having a female thread, and said first end portion is formed with a male thread with which said female thread of said front hand-held portion is threadingly engaged.

4. The handle according to claim 3, wherein said hand-held portion further includes a rear hand-held portion connected to said second end portion.

5. The handle according to claim 1, wherein said hand-held portion is adapted to be held between an arm and breast side of a fishing person.

6. The handle according to claim 1, wherein each of said first and second end portions circumscribes an entire circumference of said tubular body.

7. A handle for a fishing rod, which is mounted on a tubular body of said rod and extends in a longitudinal direction of said tubular body, said handle comprising:
   a hand-held portion including:
      first and second end portions spaced apart from each other in said longitudinal direction and both fixed to said tubular body; and
   at least one bridge connecting said first and second end portions and expanding radially outward relative to said first end portion with respect to said tubular body, said bridge being spaced apart from said tubular body when viewed in a direction transverse to said longitudinal direction, and forming a separation space between said tubular body and said bridge.

8. The handle according to claim 1, wherein at least one foam material or natural cork member is provided in said separation space between said bridge and said tubular body.

9. The handle according to claim 8, wherein at least a portion of said tubular body between said first and second end portions is exposed.

10. The handle according to claim 9, wherein said handle further includes a finger rest provided between said first and second end portions so as to contact with said portion of said tubular body.

* * * * *